(12) United States Patent
Dutta-Choudhury et al.

(10) Patent No.: US 6,718,074 B1
(45) Date of Patent: Apr. 6, 2004

(54) METHOD AND APPARATUS FOR INSPECTION FOR UNDER-RESOLVED FEATURES IN DIGITAL IMAGES

(75) Inventors: Paul Dutta-Choudhury, Frankilin, MA (US); Joe Scola, Medfield, MA (US); Brad Safford, Framingham, MA (US); Igor Reyzin, Needham, MA (US)

(73) Assignee: Cognex Corporation, Natick, MA (US)

( * ) Notice: Subject to any disclaimer, the term of this patent is extended or adjusted under 35 U.S.C. 154(b) by 619 days.

(21) Appl. No.: 09/585,633

(22) Filed: Jun. 2, 2000

(51) Int. Cl.[7] .............................. G06K 9/00; G06K 9/36; H04N 1/393; G06T 3/40
(52) U.S. Cl. ..................... 382/299; 382/141; 382/173; 382/300; 382/282; 358/451; 358/525; 348/240.2; 348/561; 345/660; 345/667
(58) Field of Search ................. 382/298, 299, 382/300, 173, 282, 284; 358/451, 525, 453; 345/606, 607, 608, 609, 610, 648, 660, 667, 668, 669, 670, 671; 348/240.2, 240.99, 581, 704, 561, 584

(56) References Cited

U.S. PATENT DOCUMENTS

| | | | |
|---|---|---|---|
| 4,578,812 A | | 3/1986 | Yui |
| 4,700,400 A | * | 10/1987 | Ross .......................... 382/205 |
| 4,808,987 A | * | 2/1989 | Takeda et al. .............. 345/667 |
| 4,910,694 A | | 3/1990 | Walther |
| 4,977,602 A | * | 12/1990 | Beato .......................... 382/298 |
| 4,980,706 A | * | 12/1990 | Someya ....................... 382/298 |
| 4,988,984 A | | 1/1991 | Gonzalez-Lopez |
| 5,008,752 A | | 4/1991 | Van Nostrand |
| 5,125,043 A | | 6/1992 | Karlsson |
| 5,276,786 A | * | 1/1994 | Long et al. .................. 345/428 |
| 5,307,167 A | | 4/1994 | Park et al. |
| 5,327,257 A | | 7/1994 | Hrytzak et al. |
| 5,446,804 A | * | 8/1995 | Allebach et al. ............ 382/298 |
| 5,469,274 A | * | 11/1995 | Iwasaki et al. ............. 358/450 |
| 5,481,311 A | | 1/1996 | Boie |
| 5,521,636 A | | 5/1996 | Nakayama et al. |
| 5,546,479 A | * | 8/1996 | Kawanaka et al. ......... 382/290 |
| 5,570,436 A | | 10/1996 | Fukushima et al. |
| 5,666,160 A | | 9/1997 | Hwang |
| 5,754,348 A | * | 5/1998 | Soohoo ....................... 359/802 |
| 5,774,110 A | | 6/1998 | Edelson |
| 5,796,868 A | | 8/1998 | Dutta-Choudhury |
| 5,838,371 A | * | 11/1998 | Hirose et al. ............ 348/240.2 |

(List continued on next page.)

OTHER PUBLICATIONS

Keys, Robert G; "*Cubic Convolution Interpolation for Digital Image Processing*"; IEEE Transactions on Acoustics, Speech, and Signal Processing, Dec. 1981; vol. ASSP–29.

Primary Examiner—Jingge Wu
Assistant Examiner—Ryan J. Hesseltine
(74) Attorney, Agent, or Firm—Russ Weinzimmer

(57) ABSTRACT

A machine vision inspection system and method that increase the resolution of object image-data without physically manipulating the physical optics of cameras used during inspection. The exemplary embodiment of the invention provides a system and method that perform what may be characterized as a digital zoom. Using this digital zoom, the resolution of object image-data provided by a camera may be artificially increased. Moreover, in accordance with the exemplary embodiment of the invention, a determination may be made regarding whether portions of the object image-data are under-resolved, and based on that determination, a local digital zoom may be performed on that under-resolved portion of object image-data to increase the resolution of that portion of object image-data. Additionally, the resulting portion of the object image-data with increased image resolution may be scaled-back, such that the portion of increased resolution object image-data may be combined with the other object image-data to provide a faithful, scaled representation of the original sample-object and/or sample-object feature.

18 Claims, 6 Drawing Sheets

U.S. PATENT DOCUMENTS

| | | |
|---|---|---|
| 5,850,487 A | 12/1998 | Takane et al. |
| 5,905,530 A * | 5/1999 | Yokota et al. ......... 348/240.99 |
| 5,917,963 A | 6/1999 | Miyake |
| 5,949,901 A * | 9/1999 | Nichani et al. ............. 382/149 |
| 6,002,812 A | 12/1999 | Cho et al. |
| 6,040,791 A | 3/2000 | Kassmann |
| 6,215,915 B1 * | 4/2001 | Reyzin ....................... 382/296 |
| 6,356,314 B1 * | 3/2002 | Takebe ....................... 348/564 |
| 6,463,432 B1 * | 10/2002 | Murakawa ..................... 707/5 |

* cited by examiner

Case 1: Thick cross image

Case 1: Sobel magnitude image:

Case 2: Thin cross image

Sobel magnitude image:

METHOD AND APPARATUS FOR INSPECTION FOR UNDER-RESOLVED FEATURES IN DIGITAL IMAGES

BACKGROUND OF THE INVENTION

1. Field of Invention

This invention relates to inspection systems and methods for machine vision applications, and more particularly relates to techniques and systems that provide improved processing of under-resolved data for object feature detection.

2. Description of Related Art

Machine vision systems are increasingly employed to augment or replace human vision in a wide range of industrial manufacturing processes. Machine vision inspection systems are presently being used in such industries as biomedical, automotive, semiconductor wafer and semiconductor chip inspection. A machine vision system typically provides computer-based image processing capabilities that may or may not be automated and can be customized for various vision tasks, for example, machine guidance, part identification, gauging, alignment, or inspection tasks. In such tasks, a machine vision system captures an image of a sample-object of interest and processes that image to produce sample-object information such as position, size and orientation.

Machine-vision systems and methods typically use an analog or digital video still-frame camera to take a picture(s) of a sample-object and provide greyscale or color object image-data corresponding to features of the sample-object. This object image-data is typically provided to a computer display for review by an operator, or output to equipment handling the object. For example, object image-data may be sent to bells, lights or other devices that may alert an operator to a problem. Alternatively, the object image-data may be processed resulting in directives sent to a mechanical diverter that removes defective parts from a manufacturing line, or to a positioning table that moves sample-objects into position prior to a manufacturing step. Additionally, the object image-data may, for example, be processed for comparison against a known model or template to determine the quality of a sample-object under inspection.

An important image processing capability typically provided by machine vision systems is object and feature edge detection for automated inspection. Feature edge detection involves processing greyscale object image-data to extract the edge features of the object under inspection. Object feature edge detection may generally be achieved by extracting selected information from an object image and evaluating the selected information to locate edgelets, i.e., edge points or edge vectors within the object image-data. Edgelet information, e.g., edge point magnitude or edge point angle, can then be used as the basis for determining, object feature size, position or identification. For example, see "Quantitative methods of edge detection," by I. E. Abdou, in USCIPI Report 830, Image Processing Institute, Univ. Southern California, July 1978.

One of the fundamental challenges for machine vision object and feature edge detection is the robust and accurate edge detection of under-resolved object image-data. When a sample-object under inspection comprises a minimal number of features that are of a relatively large size in comparison to the image field of view, the resolution of the object image-data may be set such that a requisite resolution is provided so that the features may be effectively inspected.

However, when a sample-object under inspection comprises many features in a single field of view that is significantly larger than the size of the features, conventional feature edge extraction methods and systems can fail to provide object image-data resolution sufficient for reliable and accurate feature edge detection. As a result, although conventional feature edge extraction methods and systems may provide quality object image-data when operating within their performance bounds, the available image-data resolution is sometimes insufficient to provide for accurate edge detection and subsequent feature-based inspection.

Conventionally, if an object or feature that is less than seven or eight pixels along any axis, the image pixel data including the object or feature is generally classified as being under-resolved. Conventionally, such under-resolved data is problematic in performing boundary-inspection techniques because quality feature edge data cannot be reliably obtained from features that are insufficiently represented in the object image-data.

Although various conventional techniques have been used to compensate for under-resolved data, these techniques are time-consuming and can introduce unacceptable cost to performance tradeoffs. One such technique requires installing higher resolution cameras as part of the inspection system. However, such installation can be extremely costly for large manufacturing facilities with multiple inspection lines. Another technique involves manipulating the physical optical elements used in the camera that obtains the object image-data, e.g., moving a lens closer to the object to provide better resolution of smaller features under inspection. Such a technique is commonly understood to be a physical optic zoom.

However, a physical optic zoom requires, at the least, a sufficient amount of time to adjust the physical optics elements during an inspection process. Such an adjustment may also require a more complicated camera setup, i.e., one having the capability to perform pre-programmed physical optic zoom using a motorized depth and lens control. A faster non-mechanical alternative to physical optical zoom is to use multiple fixed optical setups that provide redundant possibly overlapping views of different portions the field of view at varying magnification factors. This approach eliminates the runtime motor adjustment at the cost of multiple conventional cameras. Depending on the physical constraints of the inspection process this approach may provide a valid alternative. Usage of digital zoom provides an alternative to these physical methods that leverages the steadily increasing processing capabilities of modem computers. This is in contrast to the physical options described that have remained relatively fixed in cost over that last decade.

SUMMARY OF THE INVENTION

The exemplary embodiment of the invention provides a system and method that increase the resolution of object image-data without altering the physical optics of cameras used during inspection. The exemplary embodiment of the invention provides a system and method that perform what may be qualitatively characterized as a software or digital zoom effect. Using this technique, the resolution of object image-data provided by a camera may be reliably increased by a factor ranging from 100 to 400%.

Moreover, in accordance with the exemplary embodiment of the invention, a determination may be made regarding whether portions of the object image-data are under-resolved. Then based on that determination, a local digital zoom may be performed on that under-resolved portion or sub-window of object image-data to increase the resolution of that portion of object image-data. Additionally, the resulting portion of the object image-data with artificially increased image resolution may be scale normalized. This step allows the portion of increased resolution object image-data to be combined with the other non-zoomed object image-data to provide an accurate representation of the original sample-object and/or sample-object at the original working image resolution.

The exemplary embodiment of the invention may be implemented as part of the training phase of a machine vision system and/or as part of run-time processing, i.e., operation of the machine vision system to inspect sample-objects during the active on-line operating cycle.

BRIEF DESCRIPTION OF THE DRAWINGS

FIGS. 3(a)–(d) are illustrative aids for explaining the problems associated with applying conventional edge detection techniques to under-resolved image data;

DETAILED DESCRIPTION OF EXEMPLARY EMBODIMENT

While the present invention will hereinafter be described in connection with an exemplary embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
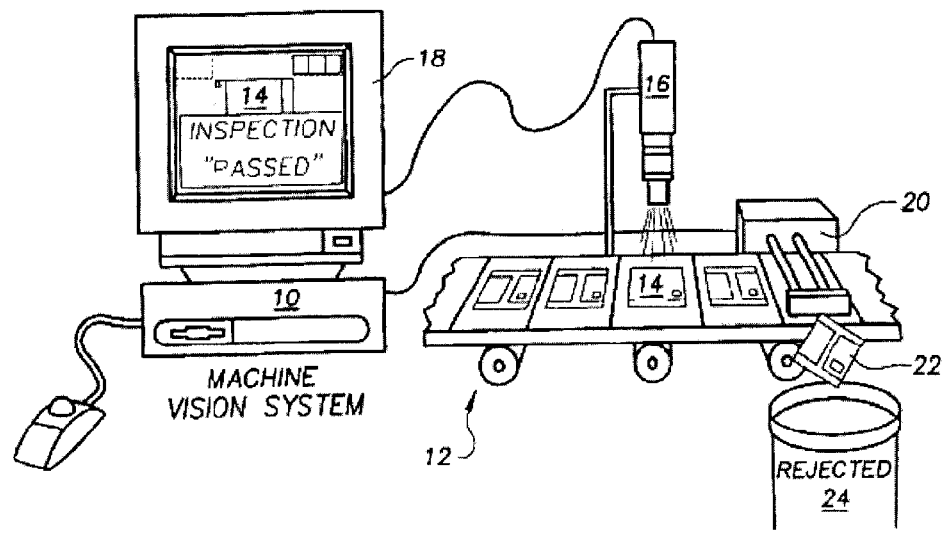
FIG. 1 illustrates an exemplary embodiment of a machine vision system with digital zoom functionality.

Referring to FIG. 1, in accordance with the present invention, there is provided a digital zoom system that can be employed by, for example, a machine vision system for aid in making decisions and providing information about objects in an inspection process such as commonly occur in automated manufacturing. For example, the digital zoom system can be employed in a machine vision inspection system 10 for a manufacturing line such as a manufacturing line 12, as shown in the figure. Using the inspection system, sample-objects 14, e.g., computer disks can be inspected for compliance with metrics such as size, shape, or the presence of defective characteristics such as scratches, stains, or extraneous printing.

Image(s) of the sample-objects 14 is obtained by camera 16 which is, for example, a CCD camera, connected to the vision system for conversion by the machine vision system 10 to a digital representation, e.g., a greyscale representation, of the computer disk image. The machine vision system 10 can include a display monitor 18 or other means for displaying the acquired sample-object image for a manufacturing line operator. After determining the edgelets of the sample-object 14 under inspection, the machine vision system can provide information about the sample-object's position, geometry, size, or other characteristics. Additionally, the machine vision system with digital zoom will support the specification of whether any portions of the obtained image contain under-resolved data. Subsequently, the machine visions system can be configured to perform a digital zoom to provide increased resolution for regions that are identified as containing under-resolved data.

Following any necessary digital zoom, the machine vision system may, for example, determine if the sample-object under inspection meets quality control standards with regard to size, or inspect ion features, etc. These standards can be "taught" to the vision system during a training mode, by way of, producing training templates from examples of sample-objects that meet any established visual inspection quality criteria. The machine vision system can then compare a questionable sample-object under inspection against its pre-trained templates, in some manner, to determine if the sample-object satisfies the inspection criteria. In this regard, it should be appreciated that the digital zoom may be used to provide training time sample-object image-data that is sufficiently resolved to facilitate the synthesis of accurate object templates or models. Therefore, the digital zoom may be performed as part of the training process wherein, templates or models are created. It is foreseeable that, during a training mode, the machine vision system may work in cooperation with a line operator or other individual to produce training templates. However, it should be understood that the machine vision system might also perform automated training template production.

Additionally, the digital zoom may be perform ed as part of run-time operation in which a sample-object currently under inspection is compared against a previously trained or archived sample-object template or model. It should also be appreciated that, during run-time mode, the machine vision system may work as an automated system, with little or no control necessary by a line operator. However, it should be appreciated that, during run-time mode, the machine vision system may interact with a line operator so as to allow the line operator to control any or all of timing of acquiring the sample-object image, adjustment of digital zoom scaling factors, and subsequent determination of whether the generated inspection results are acceptable.

During run-time mode, if the vision system ascertains that the sample-object under inspection does satisfy inspection standards, an indication of such a condition can be provided on the display 18 as, e.g., the word "Passed," or can be provided to an operator or automatic indicator on the assembly line in another fashion such as recording into a data log. Alternatively, no indication other than the continuation of the sample-object to later stages of an assembly process may be provided. If the vision system ascertains that a sample-object under inspection does not meet the standard, a mechanical manipulator, for example, a mechanical diverter 20 as shown in FIG. 1, connected to the vision system, can be signaled to remove a faulty sample-object 22 from the line when the faulty sample-object 22 is conveyed to the location of the diverter. The diverter might move the faulty sample-object off of the line and into, e.g., a storage receptor 24 for rejected sample-objects. As will be recognized by those skilled in the art, many alternative object inspection and manipulation functions can be provided in a manufacturing line machine vision system like that of FIG. 1.

Figure 2:
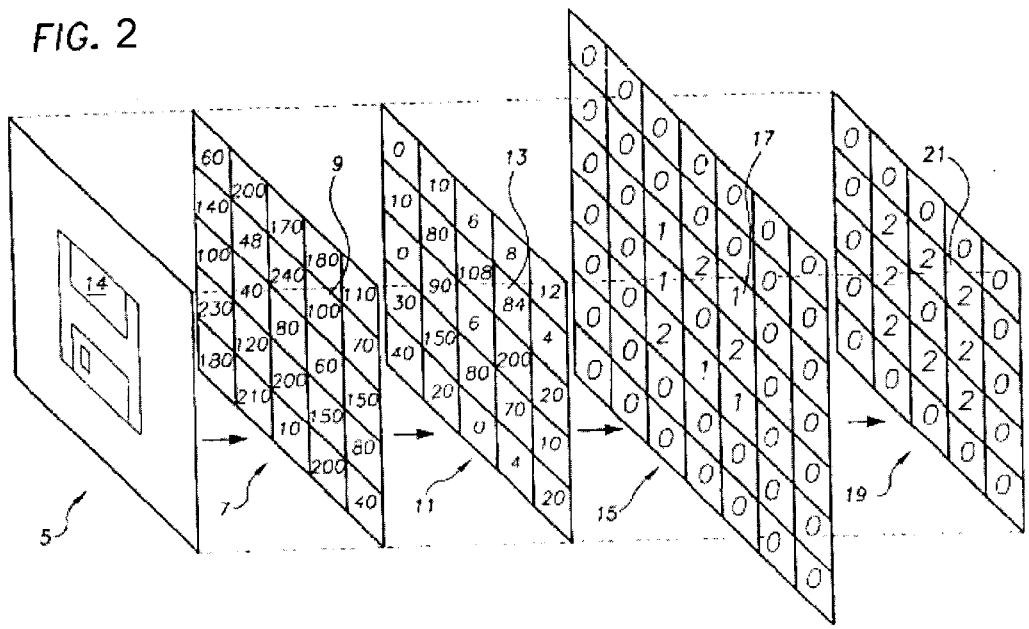
FIG. 2 illustrates an exemplary illustration used to explain the image analysis processing provided by a machine vision system with digital zoom capability in accordance with the exemplary embodiment of the invention.

An example of the image analysis processing provided by a machine vision system with digital zoom capability in accordance with the exemplary embodiment of the invention is illustrated in FIG. 2. The image of a sample-object image 14 to be analyzed is acquired, as described above, to produce, e.g., a video frame 5 of the sample-object 14 image. This video image is digitized and converted to object image-data represented by an array of pixels 7; i.e., an object image pixel array, or grid, of greyscale values is produced to represent the sample-object. For example, one pixel 9 in the object image pixel array has a greyscale value of 100, indicating the image intensity of the corresponding location in the video frame.

An edge detector in the machine vision system 18 processes the object image pixel array to produce an edge image array 11 of edge image coordinates that correspond directly to the object image pixel array. Each edge image coordinate consists of a value indicative of the edge magnitude associated with a corresponding pixel in the object image pixel array. Accordingly, the one object image pixel 9 having a greyscale value of 100 corresponds to an edge image coordinate 13 of value 84.

For a more detailed explanation of a machine vision system that may be modified to incorporate the capability of digital zoom, please refer to U.S. Pat. No. 5,796,868, issued to Paul Dutta-Choudhury on Aug. 18, 1998, assigned to Cognex Corporation and incorporated by reference herein in its entirety.

As explained briefly above, some sample-objects include features of small size in comparison to overall size of the sample-object to be inspected. The presence of such under-resolved image-data regions in sample-object image-data creates problems for inspection techniques because a machine vision system or an on line operator lacks the requisite information to determine whether a feature of interest meets satisfies quality standards. The presence of under-resolved image-data is particularly problematic for boundary-based inspection techniques, because quality edge data cannot be reliably obtained from features that are insufficiently represented on the source image pixel grid.

Accordingly, the exemplary embodiment of the invention provides a machine vision system and method that uses algorithmic magnification, i.e., digital zooming, of pixel data to improve edge detector performance. Such an improvement is possible because, in expanded image-data provided by a conventionally understood machine vision system, e.g., that disclosed in U.S. Pat. No. 5,796,868, edges become more spatially separated, allowing valid support neighborhoods to be defined for them. Additionally, areas of missing and poorly sampled data can be filled in and repaired. These factors allow the edge contours obtained from the zoomed image t o be a more complete and faithful scaled representation of the original feature.

Figures 3A, 3B:
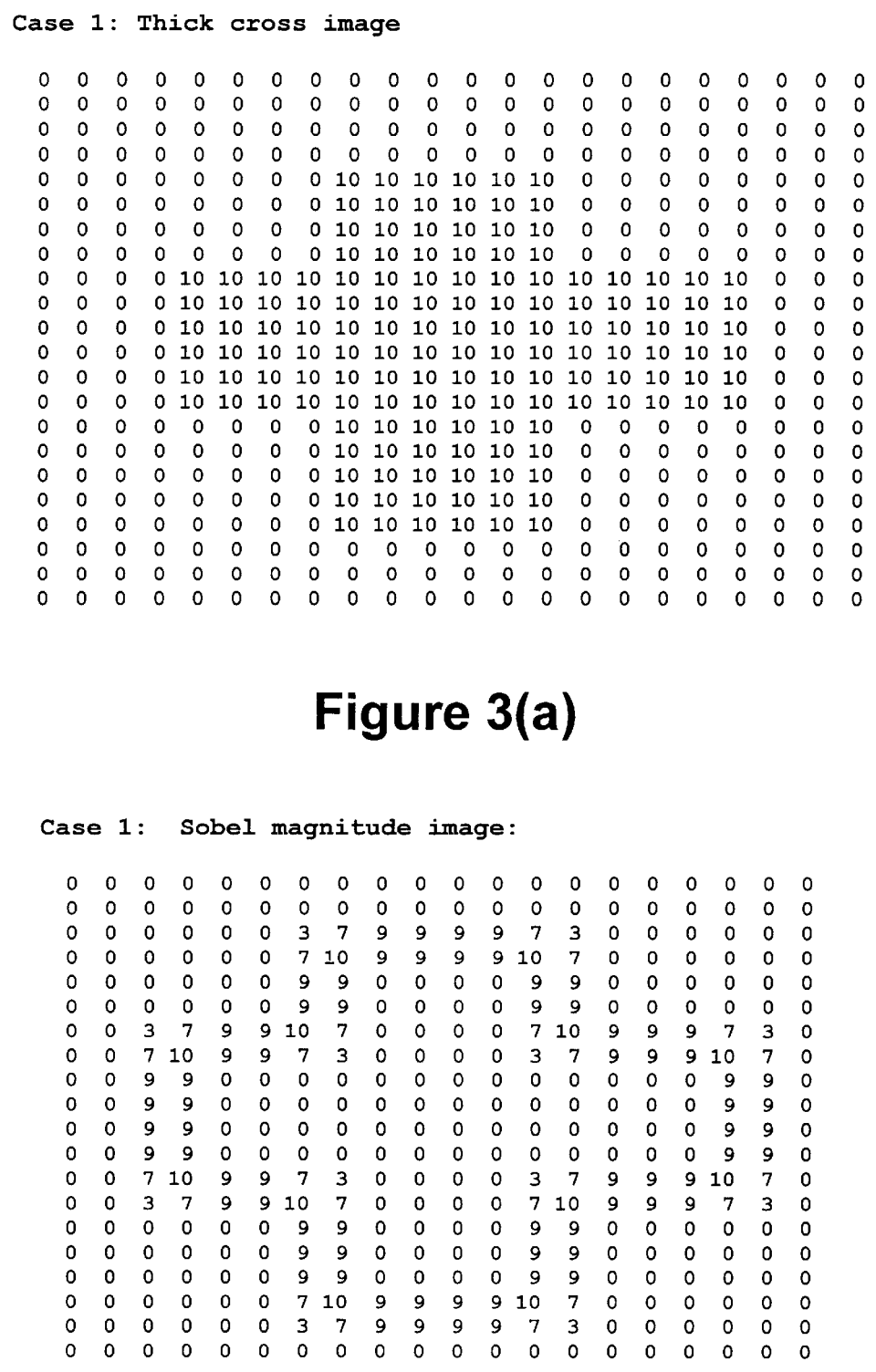

FIGS. 3(a)–3(d) are illustrative examples which may be used to further explain the problems associated with applying conventional edge detection techniques to under-resolved image data. FIG. 3(a) illustrates one example of image data include a cross image that has a specific thickness. FIG. 3(b) illustrates the results of a Sobel magnitude transformation performed on the image data illustrated in FIG. 3(a). As shown in FIG. 3(b), the edges of the cross image of FIG. 3(a) correspond to an area in which the magnitude of the image data changes. However, in FIG. 3(b), the center of the cross image has an area with a magnitude of stable image data values, correctly indicating no detected edges within the image data. As a result, when FIGS. 3(a) and 3(b) are viewed in combination, it should be appreciated the Sobel magnitude transformation accurately processes the image data to accurately encode the outline of the cross image.

Figures 3C, 3D:
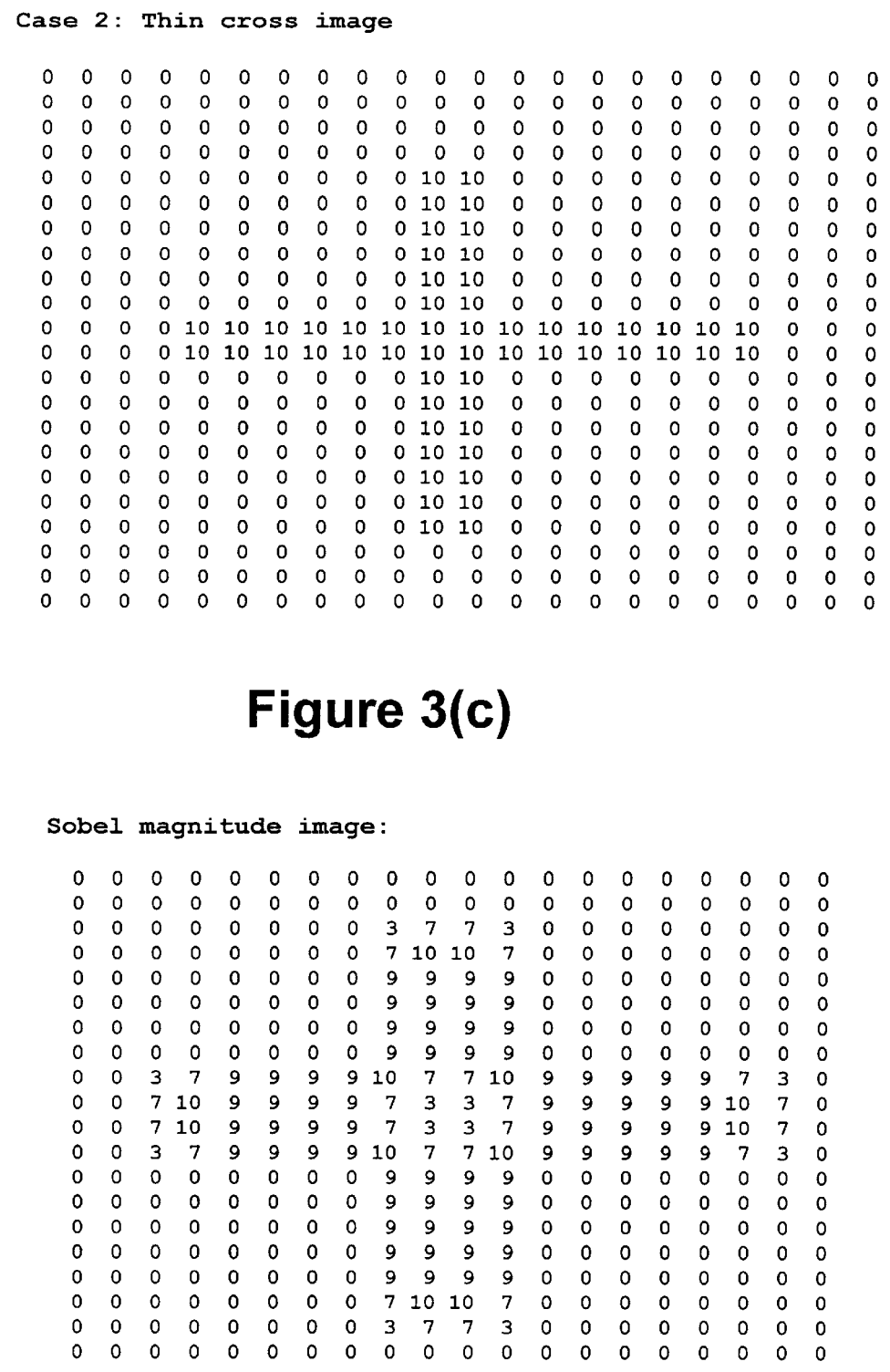

The Sobel magnitude transformation explained in conjunction with FIGS. 3(a)–(b), can be distinguished from the transformation illustrated in FIGS. 3(c)–(d). FIG. 3(c) illustrates one example of image data include a cross image that has a specific thickness that is smaller than that illustrated in FIG. 3(a). FIG. 3(d) illustrates the results of a Sobel magnitude transformation performed on the image data illustrated in FIG. 3(c). As shown in FIG. 3(d), the edges of the cross image of FIG. 3(c) correspond to an area in which the magnitude of the image data changes. However, in contrast to FIG. 3(b), the magnitudes shown in the center of the cross image shown in FIG. 3(d) vary. As a result, when FIGS. 3(c) and 3(d) are viewed in combination, it should be appreciated the Sobel magnitude transformation does not accurately process the image data of FIG. 3(c) to encode the outline of the cross image. One reason for this inaccuracy is because the thickness of the cross image illustrated in FIG. 3(c) is too thin to be accurately encoded using a Sobel magnitude transformation. It should be appreciated that the image data illustrated in FIG. 3(c) is outside the operational characteristics of the filter, e.g., the Sobel magnitude transformation.

Digital zoom is accomplished by considering the acquired sample-object image pixels as samples of an imagined higher resolution sample-object image and by reconstructing that sample-object image using interpolation. In this context, interpolation consists of estimating the grey-level values of intermediate pixel locations in an image based on the available pixel values surrounding the location of the imagined missing pixels. In practice, it is preferable that this approach work with original sample-object pixel data that possesses good intrinsic signal to noise ratio, square pixels, and is sampled at the appropriate rate. However, the benefits provided by the exemplary embodiment of the invention may not be limited to data that meets those characteristics.

In accordance with the exemplary embodiment of the invention, the choice of interpolation function used during digital zoom is important. Simple nearest-neighbor or bilinear interpolation is insufficient as it yields inferior results as explained in Keys, Robert G., "Cubic Convolution Interpolation for Digital Image Processing", IEEE Transactions on Acoustics, Speech and Signal Processing, Vol. ASSP-29, No. 6, December, 1981, incorporated herein by reference in is entirety. Accordingly, the exemplary embodiment of the invention uses high precision interpolation, e.g., cubic interpolation. Recent advancements in cubic interpolation implementation techniques and recent price reductions for digital cameras significantly enhance the viability of the exemplary embodiment of the invention. For example, see issued U.S. Pat. No. 6,215,915, entitled "Image Processing Methods and Apparatus for Separable, General Affine Transformation of an Image", issued on Apr. 10, 2001, and incorporated herein by reference in its entirety.

Figure 4:
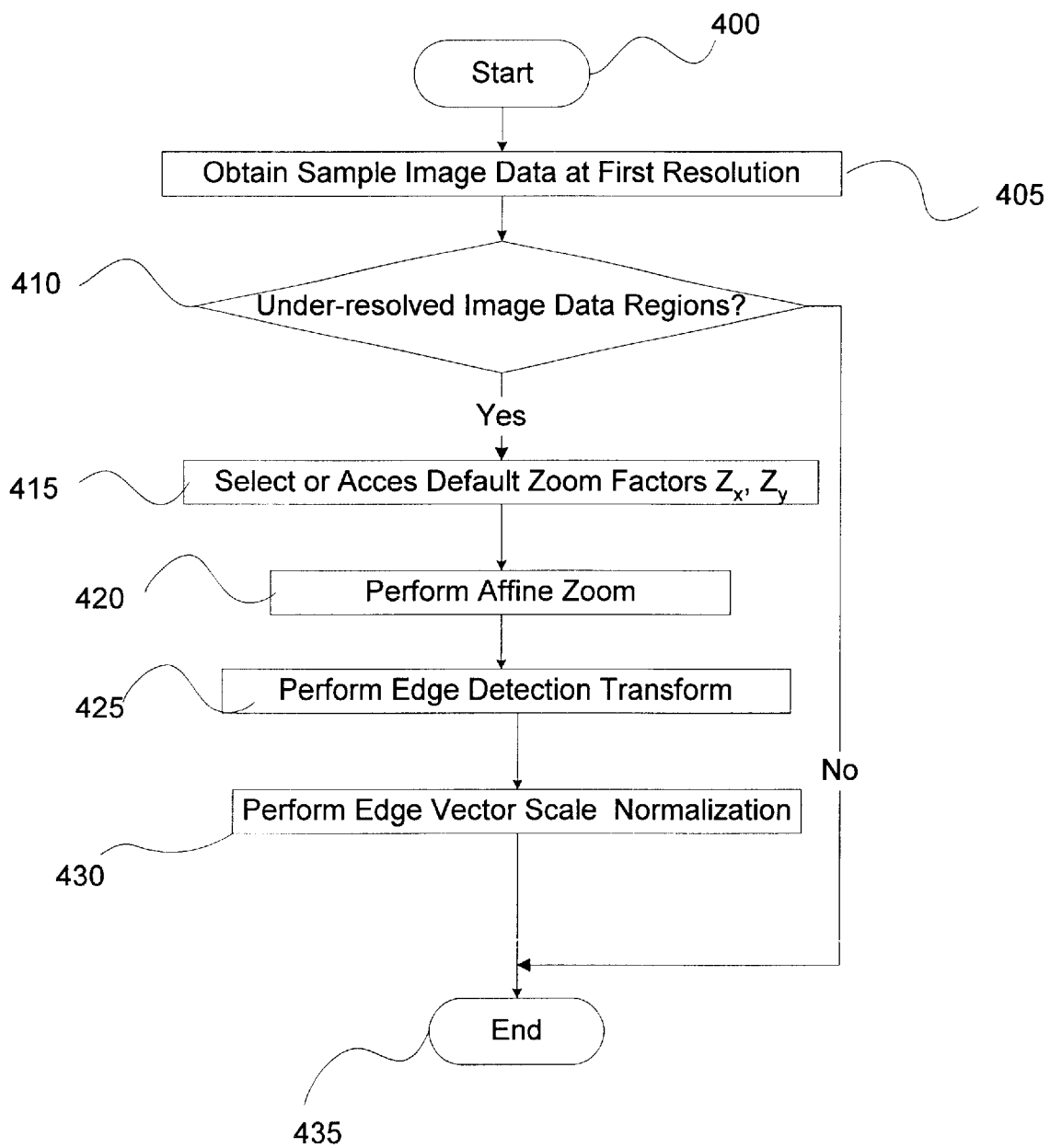
FIG. 4 illustrates an exemplary embodiment of a digital zoom method in accordance with the exemplary embodiment of the invention.

FIG. 4 illustrates a method for performing a digital zoom in accordance with the exemplary embodiment of the invention. As shown in FIG. 4, the method begins at 400 and control proceeds to 405. At 405, sample-object image-data at a first resolution, e.g., corresponding to a resolution provided by a camera obtaining the sample-object image-data, is obtained. Control then proceeds to 410, at which it is determined whether the sample-object image-data includes any under-resolved image-data regions. It should be appreciated that this determination may be performed manually, for example, based on a perception of a line operator, or automated. If not, control proceeds to 435, at which the method of performing a digital zoom ends because there is no need to perform a digital zoom if there are no under-resolved image-data regions. If so, control proceeds to 415 at which zoom factors $Z_x$ and $Z_y$ are selected or default zoom factors are accessed. $Z_x$ and $Z_y$ are respectively the zoom factors for the x-direction and the y-direction in the two-dimensional sample-object image-data. It is foreseeable that the zoom factors $Z_x$ and $Z_y$ may be the same or may be different from each other. $Z_x$ and $Z_y$ may be, for example, within the range between 1 and 4.

Control then proceeds to 420, at which a cubic-based affine transformation is performed on that portion of the sample-object image-data that has been determined to contain under-resolved image-data. For example an affine transformation similar to that disclosed in U.S. Pat. No. 6,215,915 may be utilized.

Affine transformation allows a user to create images by sampling input sample-object image-data with an affine rectangle, e.g., a quadrilateral in which the opposite sides are parallel to each other. Affine transformation produces image-data by sampling the contents of an affine rectangle within an input image. The exemplary embodiment of the invention analyzes the under-resolved sample-object image-data within the affine rectangle as if it were sampled data of imaginary higher resolution input sample-object image-data. With this understanding in mind, the exemplary embodiment performs a combination of the affine transformation and high-precision interpolation to inject pixel values for pixels that were not present in the original input sample-object image-data.

High-precision interpolation, i.e., cubic convolution interpolation, is similar to bilinear interpolation except that high-precision interpolation considers more pixels than bilinear interpolation when determining the value of a sampled pixel. In general, high-precision interpolation offers higher accuracy than does bilinear interpolation at a cost of slower execution speed. With the appropriate boundary conditions and constraints on the interpolation kernel, the accuracy of cubic convolution is between that of linear interpolation and that of cubic splines. For a more detailed explanation of cubic interpolation, see Keys, Robert G., "Cubic Convolution Interpolation for Digital Image Processing".

As a result of the affine transformation, new transformed image-data corresponding to the original under-resolved image data is generated at a second resolution higher than the first resolution is produced.

Control then proceeds to 425, at which an edge detection transform is performed. The edge detection transform locates edges within the image-data at the second resolution. It also removes constant and slowly varying backgrounds from the image-data, leaving edges as the only image feature. The edges are typically characterized as vectors defined by attributes of position and magnitudes and angle.

The edge of an object is marked by a change in grey level from dark to light or from light to dark, and it is characterized by two properties: magnitude and angle. The magnitude of an edge is the amount of change in grey level when crossing the edge. The angle of an edge is the angle of a line drawn perpendicular to the edge. The angle and magnitude of an edge can change continuously. For example, a curvy edge may have both a varying angle and varying edge magnitude.

Applying the transform produces an image of edge magnitudes in which the value of each pixel corresponds to the gradient magnitude in the input grayscale image at the corresponding location. The edge angle image encodes the direction of the gradient for the corresponding locations in the magnitude image. Edge angles are expressed relative to the image coordinate system. An edge angle of 0° indicates a dark-to-light edge perpendicular to the image coordinate system x-axis. Edge angles increase counter-clockwise. In the commonly used eight-bit representation, edge angle values are scaled to the range 0–255 in increments of 1.40 degrees.

A commonly used edge detection transform is Sobel convolution (e.g., Ballard, D. H. et al., Computer Vision, Section 3.1, pp. 76–81, Prentice-Hall, Englewood Cliffs, N.J., 1982.) The edge magnitude and edge angle of a given pixel depends on the pixel values of the eight nearest neighbor pixels (upper, lower, left, right and four diagonal neighbors) using the Sobel operator. The edge and magnitude of the center pixel are calculated using information from the neighboring pixels, which in turn is used to calculate an overall angle and magnitude of the edge. Because the edge angle is derived directly from the image pixels, edge angles are relative to image coordinates.

The edge magnitude and edge angle images are constructed by applying the Sobel edge detection operator to input image-data, thus constructing a pair of images where each pixel represents the angle or magnitude of a 3×3 neighborhood centered on the corresponding pixel in the input image-data.

Subsequently, peak edge detection either whole or fractional, may be applied to further refine the feature extraction process and produce a filtered edgelet list from the edge magnitude and edge angle images. Optionally the edge detection transform may also include thresholding using a method such as that disclosed in U.S. Pat. No. 5,796,868 so as to remove noise from the image data at the second resolution. For further information, please see Chapter 8 (Edge Tool) of Cognex 8000 Machine Vision System Series, CVL Vision Tools Guide Volume, CVL 5.4, pp. 219–221.

It should also be appreciated that it may be preferable, in some situations, to also perform a projective transform, by which edges in radial or circular patterns can be measured. For further information, please see Chapter 17 (Labeled Projection Tool) of Cognex 8000 Machine Vision System Series, CVL Vision Tools Guide Volume, CVL 5.4, pp. 375–381. Control then proceeds to 430, at which scale normalization is performed to normalize the edgelet list for the image-data at the second resolution to be comparable to other sufficiently resolved sample-object image-data at the first resolution. Further, explanation of how this scale normalization is performed is provided below with reference to FIG. 5. Edgelet scale normalization produces a normalized edgelet list for the previously under-resolved grayscale data. Control then proceeds to 435, at which the digital zoom method ends.

Prior to, subsequent to, or in parallel with the digital zoom method, a method for producing an edgelet list for the sufficiently resolved data within the sample-object image-data may be performed. Subsequently, the normalized edgelet list corresponding to the previously under-resolved data may be combined with the edgelet list corresponding to the sufficiently-resolved data and be used for machine vision inspection of the sample-object either in a training mode or a run-time mode.

Figure 5:
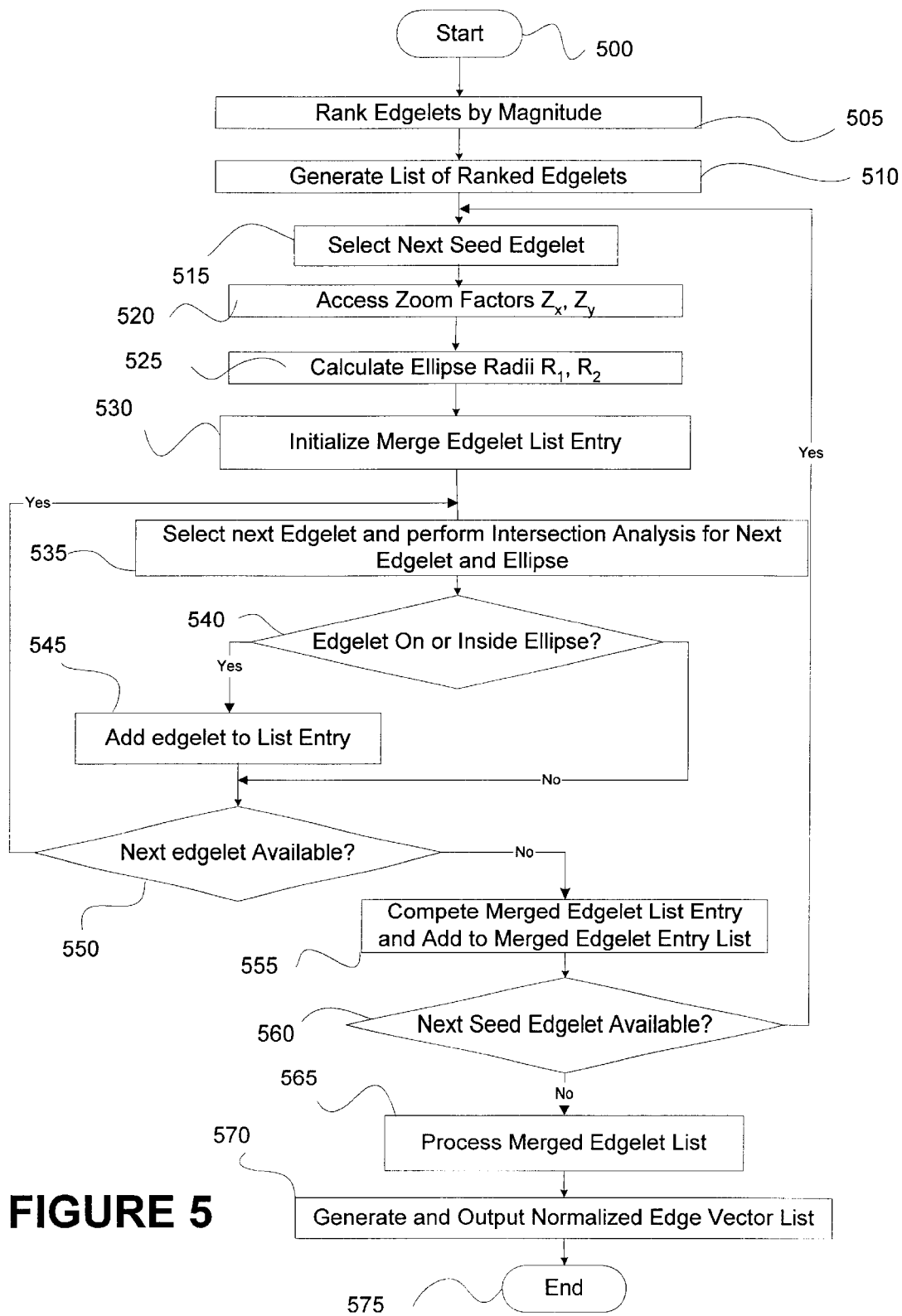
FIG. 5 illustrates an exemplary embodiment of the edgelet scale normalization method performed during digital zoom in accordance with the exemplary embodiment of the invention.

FIG. 5 illustrates a method for performing scale normalization of the edgelets provided by the edge detection transform applied to the image zoomed to the second resolution. The primary problem to be overcome during edgelet scale normalization is the influence of pixel grid bias effects on edge point averaging. Pixel grid bias refers to an artifact of grouping of pixels based upon a static grid. Clusters of edge points that straddle boundaries on the grid can be arbitrarily split into separate groups because of their position relative to the grid.

Once the edgelet list is produced from the affine transformed input sample-object image-data, the edgelet list may be normalized or "re-scaled" back from the second resolution to the original, first resolution. Rescaling is necessary, for example, when the data may be used to produce inspection results of sample-objects at the sample-objects' original scale.

As illustrated in FIG. 5, the scale normalization method begins at 500 and control proceeds to 505. At 505, the list of edgelets obtained from the image-data scaled to the second resolution, is ranked by magnitude value from strongest to weakest using an efficient sorting algorithm, e.g., Quicksort. Control then proceeds to 510, at which a ranked list structure is generated and maintained as a resource. Each entry of the ranked edgelet list includes a flag field that indicates if the entry has been used.

Control then proceeds to 515, at which a first, or next, entry in the list, is selected as the initial seed edgelet. Control the proceeds to 520, at which the zoom factors $Z_x$ and $Z_y$ used earlier to produce the image at the second resolution are accessed.

Control then proceeds to 525, at which a bounding ellipse radii $R_1$, and $R_2$ are calculated based on the zoom factors as follows:

$R_1 = Z_x/2$ $R_2 = Z_y/2$

Optionally, if R1 is not equal to R2 the angle of the edgelet can also be used as a parameter in the bounding ellipse calculation.

Control then proceeds to 530, at which an entry onto a second list, termed the Merged Edgelet List is initialized. Each entry of this list consists of collections of the edgelets from the list of edgelets ranked at 505. Control then proceeds to 535, at which a next available edgelet, i.e., an edgelet that is neither the seed edgelet corresponding to the present bounding ellipse or an edgelet that has been previously identified as part of a merged edgelet list entry of another seed edgelet, is selected from the list of ranked edgelets and tested for inclusion into the bounding ellipse. Note this is actually a directed selection process and the list structure is more complex than shown in FIG. 5. For the purpose of abstraction at this level it is possible to view it as a simple linear list.

Control then proceeds to 540, at which a determination is made whether the selected edgelet is on or inside the ellipse. If, at 540, the current edgelet falls inside or lies on the ellipse, it is added to the current merged edgelet list entry at 545. Subsequently, control proceeds to 550, at which it is determined whether there is a next available edgelet in the list of ranked edgelets. If, at 550, the current edgelet falls outside the bounding ellipse, control proceeds directly to 550. If, at 550, it is determined that there is a next available edgelet in the list of ranked edgelets, control returns to 535. If not, control proceeds to 555. A determination that there is no next available edgelet in the list of ranked edgelets indicates that all of the edges inside the ellipse have been found. Therefore, following such a determination, at 545, the merged edgelet list entry is completed, the entry is added to the merged edgelet entry list and control proceeds to 560.

It is important to recognize that an efficiency bottleneck exists in the stated procedure, relative to the testing of other entries from the list of ranked edgelets for ellipse inclusion. Without any supporting infrastructure every entry in the list needs to be checked for inclusion. Therefore, if the list of ranked edgelets has a length N, an order $N^2$ computational complexity is implied.

Figure 6:
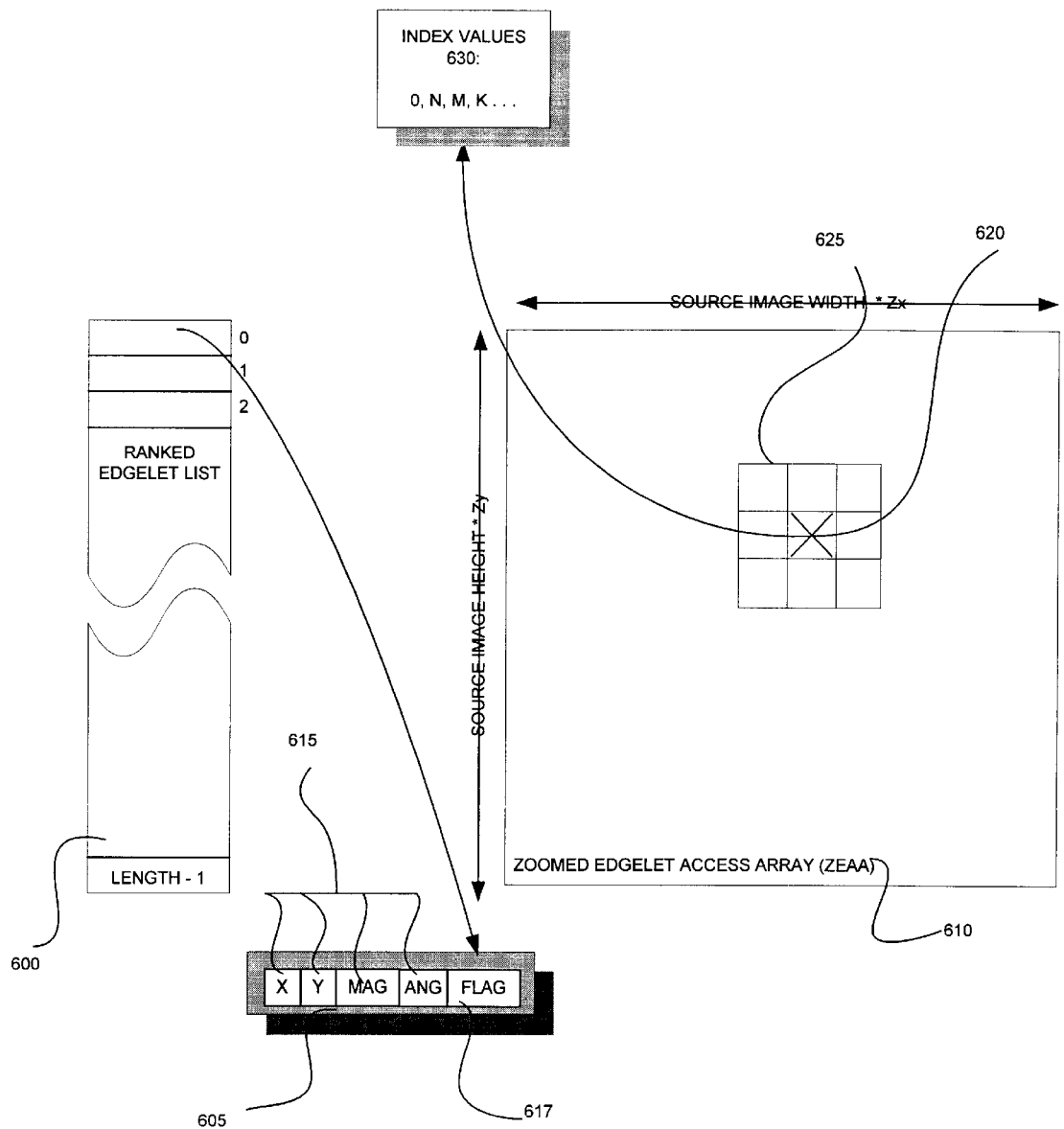
FIG. 6 is an illustrative diagram that relates to the testing of entries from the list of ranked edgelets for ellipse inclusion.

An optional design construct can be used to greatly improve performance in this area. Specifically, referring now to FIG. 6, the ranked edgelet list 600 is illustrated with an expanded version of the first element 605. Each entry 605 of the list 600 includes sub-elements 615 relating to position and edge magnitude and direction. The flag field 617 is used to indicate if the edgelet has been added to a merged edgelet list entry. Initially, all list entries 605 have their flag sub-elements 617 set to false.

An array structure 610 is initialized based upon the dimensions of the zoomed region and zoom factors Zx, Zy. Termed the "Zoomed Edgelet Access Array" (ZEAA), this structure 610 is used to encode the spatial relationship of elements from the ranked edgelet list 600. The ZEAA 610 is computed by traversing 600. A cell of the ZEAA 610 is selected for initialization by applying the following transform to the entries of 600:

ZEAA Row=INT(Entry $yZ_y$)

ZEAA Column=INT(Entry $xZ_x$)

As a cell is selected, the list index of the entry 605 from list 600 that chose it is recorded there. When complete, all of the entries of list 600 will have had their list index recorded into some cell of the ZEAA 610. Note, the majority of cells will be empty and a large percentage of the non-empty cells will contain multiple ranked edge list index entries.

Once ZEAA initialization is completed processing proceeds as follows. The seed edgelet 605 selects a root cell 620 of the ZEAA 610. The root cell 620 is then examined for additional index entries 630, different than that of the seed edgelet, which by definition must be present. Any additional entries found there provide selection indices back into the list of ranked edgelets 600. These edgelets are then checked for inclusion into the seed edgelet ellipse. Once the root cell 620 has completed checking, the procedure is repeated for neighboring non-empty cells 625. Depending on the values of $Z_x$, $Z_y$, a neighborhood starting at size 3×3 is checked (eight neighboring cells 625). For practical zoom factors (e.g., $\leq 4$) the maximum size of the neighborhood centered on the root cell is limited to 5×5 (check twenty-four neighboring cells). Larger zoom factors may increase the search neighborhood size and the approach starts to degrade in efficiency.

Depending on the selected zoom factor the computational complexity of this approach is roughly k*N where k is a function of the selected zoom factors. For example, if $Z_x$=2, $Z_y$=2 then k=9, or $Z_x$=4, $Z_y$=4 then k=25.

At 560, a determination is made whether there are any remaining available edgelets available for use as seed edgelets upon which a bounding ellipse may be formed. If so, control returns to 515, at which a next seed edgelet is selected. If not, control proceeds to 565, at which the merged edgelet entry list is traversed, producing one averaged/scaled edgelet per merged edgelet list entry. Alternatively, other selection criterion such as maximum or median could be used. Therefore, each merged edgelet entry produced by this process represents a sub-list of scaled edgelets that have been grouped based on proximity and without grid biasing effects. Control then proceeds to 570, at which a normalized edge vector list corresponding to the previously under-resolved data and including one edgelet entry per pixel of resolved data at the first resolution is generated and output. Control then proceeds to 575, at which the method ends.

The generated normalized edgelet list may be combined freely with edgelet lists corresponding to the sufficiently resolved data regions. Subsequently, this combined edgelet list may be used for various machine vision algorithms for the purposes of performing sample-object inspection. For example, the combined edgelet list may be used in connection with template-based training and/or run-time inspection method of the type previously described.

While this invention has been described in conjunction with the specific embodiment outlined above, it is evident that many alternatives, modifications and variations will be apparent to those skilled in the art. Accordingly, the exemplary embodiment of the invention, as set forth above, is intended to be illustrative, not limiting. Various changes may be made without departing from the spirit and scope of the invention.

What is claimed is:

1. A machine vision inspection system comprising:
   a camera that, when operated, produces original digital image data at a first resolution, the original digital image data representing an appearance of an object; and
   a processor coupled to the camera that interacts with the camera to receive the original digital image data at the first resolution,
   the processor being adapted to perform high-precision interpolation of at least one region including under-resolved data within the original digital image data such that data corresponding to the at least one region is augmented by high-precision interpolated data to provide second resolution image data corresponding to the at least one region at a second resolution, the second resolution being higher than the first resolution,
   the processor being adapted to detect edges within the at least one region of image data at the second resolution to produce edgelet data at the second resolution,
   the processor being adapted to perform scale normalization of the edgelet data at the second resolution to provide scale-normalized edgelet data corresponding to the at least one region at the first resolution,
   the processor being adapted to combine the scale-normalized edgelet data corresponding to the at least one region, and edgelet data corresponding to regions of the original digital image other than that corresponding to the at least one region, so as to provide edgelet data based on only sufficiently-resolved image data, and
   the processor being adapted to use the digital image data that includes only sufficiently-resolved data to perform inspection of the object.

2. The system of claim 1, further comprising a monitor that interacts with the processor to display the original digital image data.

3. The system of claim 1, wherein the processor is adapted to determine whether the digital data includes at least one first region including under-resolved data.

4. The system of claim 1, wherein the digital image data that includes only sufficiently-resolved data is utilized to determine if the object meets quality control standards.

5. The system of claim 1, wherein the digital image data that includes only sufficiently-resolved data is utilized to create a training template used for comparison against other digital image data corresponding to objects under inspection.

6. The system of claim 1, wherein the digital image data that includes only sufficiently-resolved data is compared with a training template.

7. The system of claim 1, wherein the high-precision interpolation performed by the processor includes cubic interpolation.

8. The system of claim 1, wherein the processor is also adapted to perform an affine zoom on the at least one first region of original image data to produce the second resolution image data at the second resolution.

9. A machine vision method for inspecting an object, the method comprising:
   obtaining original digital image data at a first resolution, the original digital image data representing an appearance of the object;
   performing high-precision interpolation of at least one region of image data including under-resolved data within the original digital image data such that data corresponding to the at least one region is augmented by high-precision interpolated data to provide second resolution image data corresponding to the at least one region at a second resolution, the second resolution being higher than the first resolution;
   detecting edges within the at least one region of image data at the second resolution to produce edgelet data at the second resolution;
   scale-normalizing the edgelet data at the second resolution to provide scale-normalized edgelet data corresponding to the at least one region at the first resolution;
   combining the scale-normalized edgelet data corresponding to the at least one region, and edgelet data corresponding to regions of the original digital image other than that corresponding to the at least one region, so as to provide edgelet data based on only sufficiently-resolved image data; and
   using the digital image data that includes only sufficiently-resolved data to perform inspection of the object.

10. The method of claim 9, further comprising determining whether the original digital image data includes any under-resolved image-data regions.

11. The method of claim 10, wherein determining whether the original digital image data includes any under-resolved image-data regions is performed in an automated fashion.

12. The method of claim 9, wherein the high-precision interpolation applies a cubic-based affine transformation on the at least one region.

13. The method of claim 9, wherein detecting edges within the at least one region includes using a Sobel convolution.

14. The method of claim 9, wherein detecting edges within the at least one region includes using peak edge detection.

15. The method of claim 9, further comprising displaying the original digital image on a monitor.

16. The method of claim 9, wherein using the digital image data that includes only sufficiently-resolved data to perform inspection of the object includes:

determining whether the object meets quality control standards.

17. The method of claim 9, wherein using the digital image data that includes only sufficiently resolved data to perform inspection of the object includes:
creating a training template used for comparison against other digital image data corresponding to objects under inspection.

18. The method of claim 9, wherein using the digital image data that includes only sufficiently resolved data to perform inspection of the object includes:
comparing the digital image data that includes only sufficiently resolved data with a training template.

* * * * *